United States Patent
Salim et al.

(10) Patent No.: US 12,245,220 B2
(45) Date of Patent: Mar. 4, 2025

(54) SIDELINK CONTROL INFORMATION DESIGN

(71) Applicant: JRD COMMUNICATION (SHENZHEN) LTD., Guangdong (CN)

(72) Inventors: Umer Salim, Guangdong (CN); Virgile Garcia, Guangdong (CN); Sebastian Wagner, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 434 days.

(21) Appl. No.: 17/630,888

(22) PCT Filed: Jul. 29, 2020

(86) PCT No.: PCT/CN2020/105384
§ 371 (c)(1),
(2) Date: Jan. 27, 2022

(87) PCT Pub. No.: WO2021/023071
PCT Pub. Date: Feb. 11, 2021

(65) Prior Publication Data
US 2022/0272727 A1    Aug. 25, 2022

Related U.S. Application Data

(60) Provisional application No. 62/883,422, filed on Aug. 6, 2019.

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0003* (2013.01); *H04L 5/0051* (2013.01); *H04W 72/02* (2013.01); *H04W 72/20* (2023.01)

(58) Field of Classification Search
CPC . H04W 72/1263; H04W 72/02; H04W 72/20; H04W 72/23; H04L 1/0003;
(Continued)

(56) References Cited

U.S. PATENT DOCUMENTS

2020/0351136 A1* 11/2020 Hwang ............ H04L 27/26025
2022/0022150 A1    1/2022 Khoryaev
2022/0159674 A1*  5/2022 Deng .................. H04W 72/566

FOREIGN PATENT DOCUMENTS

| | | |
|---|---|---|
| CN | 106063352 A | 10/2016 |
| WO | 2018175842 A1 | 9/2018 |

OTHER PUBLICATIONS

Huawei et al:"Design and contents of PSCCH and PSFCH", 3GPP Draft; R1-1906596, 3rd Generation Partnershop Project (3GPP), Mobile Competence Centre; 650, Route Des Lucioles; F-06921 Sophia-Antipolis Cedex; France, vol. RAN WG1, No. Reno, USA; May 13, 2019-May 17, 2019 May 13, 2019 (May 13, 2019). XP051728047 (Year: 2019).*

(Continued)

*Primary Examiner* — Austin J Moreau
(74) *Attorney, Agent, or Firm* — HSML P. C.

(57) ABSTRACT

Methods for the transmission of SCI messages in sidelink communications for the reservation of resources. The modulation and coding scheme of a second stage SCI may be indicated in the first stage SCI.

6 Claims, 2 Drawing Sheets

(51) Int. Cl.
*H04L 5/00* (2006.01)
*H04W 72/02* (2009.01)
*H04W 72/20* (2023.01)

(58) Field of Classification Search
CPC . H04L 5/0051; H04L 5/0091; H04L 27/2602; H04L 5/0053
See application file for complete search history.

(56) References Cited

OTHER PUBLICATIONS

Interdigital Inc:"On Physical Layer Structure for NR V2X Sidelink", 3GPP Draft; R1-1905400, 3rd Generation Partership Project (3GPP), Mobile Competence Centre; 650, Route Des Lucioles; F-06921 Sophia-Antipolis Cedex; France, Apr. 3, 2019 (Apr. 3, 2019), pp. 1-13, XP051707471 (Year: 2019).*
Nokia et al. "Discussion of physical layer structure for sidelink" 3GPP TSG RAN WG1 #97 R1-1906074, May 17, 2019. section 2.2, Appendix (Year: 2019).*
International Search Report (with English translation) and the Written Opinion issued in PCT/CN2020/105384, dated Oct. 28, 2020.
Nokia et al. "Discussion of physical layer structure for sidelink" 3GPP TSG RAN WG1 #97 R1-1906074, May 17, 2019. section 2.2, Appendix.
Fujitsu. "Discussion on physical layer structure for NR sidelink" 3GPP TSG RAN WGI #97 R1-1906436, May 17, 2019, the whole document.
Samsung. "Feature lead summary for agenda item 7.2.4.1 Physical layer structure for sidelink" 3GPP TSG RAN WG1 #96bis Meeting R1-1905665, Apr. 12, 2019. the whole document.
TCL Communications. "Physical Layer Structure for Sidelink" 3GPP TSG RAN WG1 Meeting #97 R1-1907047, May 17, 2019. the whole document.
European Search Report in European Application No. 20850126.2, mailed on Jul. 12, 2023.
Interdigital Inc:"On Physical Layer Structure for NR V2X Sidelink", 3GPP Draft; R1-1905400, 3rd Generation Partership Project (3GPP), Mobile Competence Centre; 650, Route Des Lucioles; F-06921 Sophia-Antipolis Cedex; France, Apr. 3, 2019 (Apr. 3, 2019), pp. 1-13, XP051707471.
ZTE et al: "NR sidelink physical layer structure", 3GPP Draft; R1-1906457 NR Sidelink Physical Layer Structure, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019 May 13, 2019(May 13, 2019), XP051727907.
ZTE et al: "NR sidelink physical layer structure", 3GPP Draft; R1-1904814 NR Sidelink Physical Layer Structure, 3rd Generation Partnership Project (3GPP), Mobile Competemce Centre; 650, Route Des Lucioles; F-06921 Sophia-Antipolis Cedex; France, vol. RAN WG1, No. Xi'an, China; Apr. 8, 2019-Apr. 12, 2019 Apr. 2, 2019(Apr. 2, 2019), XP051707321.
Huawei et al:"Design and contents of PSCCH and PSFCH", 3GPP Draft; R1-1906596, 3rd Generation Partnershop Project (3GPP), Mobile Competence Centre; 650, Route Des Lucioles; F-06921 Sophia-Antipolis Cedex; France, vol. RAN WG1, No. Reno, USA; May 13, 2019-May 17, 2019 May 13, 2019 (May 13, 2019), XP051728047.
Ericsson: "PHY layer structure for NR sidelink", 3GPP Draft; R1-1907134 Ericsson-PHY Layer Structure for NR Sidelink, 3rd Generation Partnership Project (3GPP), Mobile Competence Centre; 650, Route Des Lucioles; F-06921 Sophia-Antipolis Cedex, vol. RAN WG1, No. Reno, Nevada, U.S.; May 13, 2019-May 17, 2019 May 13, 2019 (May 13, 2019), XP051728580.
NTT Docomo et al:"NR Sidelink Physical Layer Structure", 3GPP Draft; R1-1905421, 3rd Generation Partnership Project(3GPP), Mobile Competence Centre; 650, Route Des Lucioles; F-06921 Sophia-Antipolis Cedex; France, Apr. 3, 2019(Apr. 3, 2019), pp. 1-10, XP051707491.
Office Action issued Chinese Application No. 202080054669.2, mailed Jan. 15, 2025, with English translation.

* cited by examiner

SIDELINK CONTROL INFORMATION DESIGN

CROSS REFERENCE TO RELATED APPLICATION

This application claims the benefit of International Application No. PCT/CN2020/105384, filed Jul. 29, 2020, which claims priority to U.S. provisional Application No. 62/883,422, filed on Aug. 6, 2019. The entire disclosures of each of the applications are incorporated herein by reference.

BACKGROUND

1. Field of the Disclosure

The following disclosure relates to sidelink control information design, in particular but not exclusively to single and dual stage sidelink control information design.

2. Description of the Related Art

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN &CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

NR has added a lot of capabilities and technical features to the wireless strategies going way beyond LTE for operation on licensed spectrum. In addition, the NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method, system and non-transitory computer readable medium in which sidelink control information is provided to a user equipment.

There is also provided a method for transmission of scheduling and control information for sidelink communications, the method comprising steps performed at a mobile device of receiving and decoding a first stage Sidelink Control Information (SCI) carrying scheduling information, receiving and decoding a second stage SCI indicated by the first stage SCI, where a modulation and coding scheme for the second stage SCI is indicated in the first stage SCI as a row index for a mapping table comprising modulation and coding schemes values for the second stage SCI, wherein the second stage SCI uses the same lower order modulation as the first stage SCI.

The modulation and coding scheme for the first stage SCI may be indicated as part of the resource pool configuration.

The first stage SCI may indicate the SCI of the associated second stage SCI.

The coded bits of the second stage SCI may be mapped from a lowest PRB location in the scheduled resource for PSSCH.

The mapping of the second stage SCI in PSSCH may start from the front-loaded DMRS symbol over the unused resource elements.

The first stage SCI may indicate the modulation and coding scheme of the associated second stage SCI.

The method may further comprise the step of identifying from the scheduling information in the first stage SCI if the mobile device is an intended receiver of a second stage SCI.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn

DETAILED DESCRIPTION OF EMBODIMENTS

Those skilled in the art will recognise and appreciate that the specifics of the examples described are merely illustrative of some embodiments and that the teachings set forth herein are applicable in a variety of alternative settings.

Figure 1:
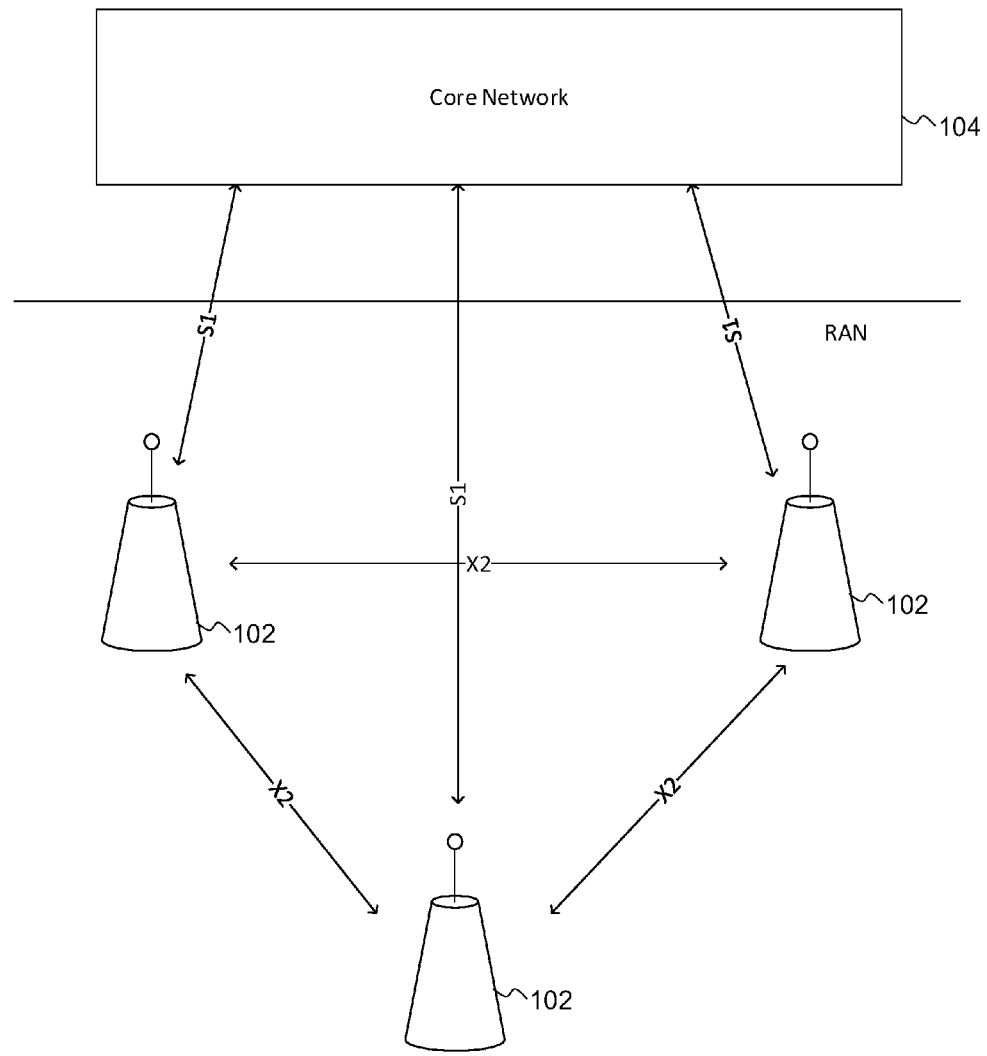
FIG. 1 shows selected elements of a cellular wireless communication network.

FIG. 1 shows a schematic diagram of three base stations 102 (for example, eNB or gNBs depending on the particular cellular standard and terminology) forming a cellular network. Typically, each of the base stations 102 will be deployed by one cellular network operator to provide geographic coverage for UEs in the area. The base stations form a Radio Area Network (RAN). Each base station 102 provides wireless coverage for UEs in its area or cell. The base stations 102 are interconnected via the X2 interface and are connected to a core network 104 via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations 102 each comprise hardware and software to implement the RAN's functionality, including communications with the core network 104 and other base stations 102, carriage of control and data signals between the core network and UEs, and maintaining wireless communications with UEs associated with each base station. The core network 104 comprises hardware and software to implement the network functionality, such as overall network management and control, and routing of calls and data.

In vehicle-to-vehicle (V2V) applications, the UEs may be incorporated into vehicles such as cars, trucks and buses. These vehicular UEs are capable of communicating with each other in in-coverage mode, where a base station manages and allocates the resources and in out-of-coverage mode, without any base station managing and allocating the resources. In vehicle-to-everything (V2X) applications, the vehicles may be communicating not only with other vehicles, but also with infrastructure, pedestrians, cellular networks and potentially other surrounding devices. V2X use cases include:

1) Vehicles Platooning—this enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended Sensors—this enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced Driving—this enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

4) Remote Driving—this enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 2:
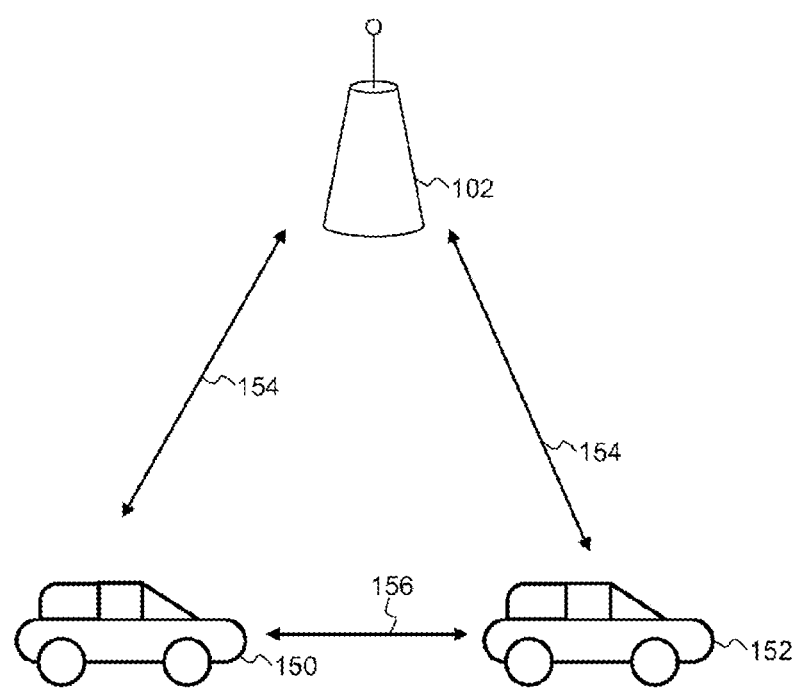
FIG. 2 shows selected elements in a Radio Area Network of the cellular wireless communication network of FIG. 1.

FIG. 2 illustrates a base station 102 forming a RAN, and a transmitter (Tx) UE 150 and a receiver (Rx) UE 152 in the RAN. The base station 102 is arranged to wirelessly communicate over respective connections 154 with each of the Tx UE 150 and the Rx UE 152. The Tx UE 150 and the Rx UE 152 are arranged to wirelessly communicate with each other over a sidelink 156.

Sidelink transmissions utilise TDD (half duplex) on either a dedicated carrier, or a shared carrier with conventional Uu transmissions between a base station and UE. Resource pools of transmission resources are utilised to manage resource and allocation and manage interference between potentially concurrent transmissions. A resource pool is a set of time-frequency resources from which resources for a transmission can be selected. UEs can be configured with multiple transmit and receive resource pools.

Two modes of operation are used for resource allocation for sidelink communication depending on whether the UEs are within coverage of a cellular network. In Mode 1, the V2X communication is operating in-coverage of the base stations (eg eNBs or gNBs). All the scheduling and the resource assignments may be made by the base stations.

Mode 2 applies when the V2X services operate out-of-coverage of cellular base stations. Here the UEs need to schedule themselves. For fair utilization, sensing-based resource allocation is generally adopted at the UEs. In Mode 2, UEs reserve resources for a transmission by transmitting a Sidelink Control Information (SCI) message indicating the resources to be used. The SCI notifies the recipient (which may be a single UE in unicast, a group of UEs in groupcast, or all reachable UEs in broadcast) of the details of the transmission it can expect. UEs may reserve transmission resources both for a first transmission of a Transport Block (TB) of data, and also for transmitting repetitions of the TB to improve reliability if the initial transmission fails.

A single stage SCI design or a dual stage SCI design may be used. Single stage SCI is similar to control signalling in LTE V2X in which the communication is broadcast. Accordingly, the SCIs are decodable by any UE that receives the SCI. This is advantageous in sensing-based resource allocation in Mode 2. However, in unicast or groupcast, UE-specific SCI information and data should not be decodable at the neighbouring UEs that are not the intended target UE (s). As such, a single stage SCI design (of a type which is decodable by any UE) may lead to security and privacy issues if used in unicast or groupcast, in particular in sensing-based Mode 2. Alternatively, a single-stage SCI only decodable by the intended target UE (s) prevents other UEs sensing resource allocations and hence reduces the ability of Mode 2 UEs to operate.

Dual stage SCI includes a first stage and a second stage. The first stage carries the scheduling information and identifies the intended receiver (s), and is decodable by all UEs. The second stage is only decodable at the intended receiver (s). This provides security for the control information and data while enabling other UEs to access useful information (related to scheduled time frequency resource). Dual stage SCI design enables sensing-based resource selection in Mode 2. As such, dual stage SCI is preferable for Mode 2, and for Mode 1 UEs operating in proximity to Mode 2 UEs.

Application of dual stage SCI across both Mode 1 (ie in-coverage) and Mode 2 (ie out-of-coverage) may ensure interoperability of UEs in different modes, for example, out-of-coverage UEs in the neighbourhood of in-coverage UEs and movement of UEs between these coverage scenarios. However, dual stage SCI may lead to unnecessary signalling overhead for UEs that are always in-coverage.

To reduce the overhead of dual stage SCI for in-coverage UEs, whilst enabling sensing-based resource selection at Mode 2 UEs, single and dual stage SCI designs may be used in a configurable manner. Specifically, out-of-coverage UEs, operating under Mode 2 of resource allocation, may always use dual stage SCI design. In-coverage UEs, operating in Mode 1 of resource allocation, may be configured to use single or dual stage SCI depending on the situation and relative priorities as identified by the base station. A base station may configure the in-coverage UEs proximate cell edges to use dual stage SCI, because these UEs might be in close proximity to Mode 2 UEs (i.e. UEs not in-coverage of the base station), and thus Mode 2 UEs need to know the Mode 1 UE allocations to avoid selecting the resources allocated by the base station in their vicinity.

In some dense deployments where neighbouring base stations are in close proximity to each other, most base stations may use single stage SCI throughout their cells (because all UEs can be assumed to be in-coverage), and only the base stations in special coverage areas (such as base stations that border any out-of-coverage areas or the zones where coverage is not fully available due to the nature of the terrain, e.g. mountains, dunes, forests, or special weather conditions etc) may configure their UEs to use dual stage SCI.

In some examples, UEs operating in resource allocation Mode 2 may always use dual stage SCI. UEs operating in resource allocation Mode 1 can be configured to use single or dual stage SCI, and the single or dual stage SCI selection may be part of resource pool configuration. Resource pool information of the network in different geographic areas and for different UEs is available to a network. As such, based on how the resource pool assignments are made, information regarding UEs performing sensing in certain resource pools is available to the network. Therefore, the network may indicate the usage of dual stage SCI for these resource pools, as part of the resource pool configuration.

In some examples, single or dual stage SCI design may be part of resource pool configuration for Mode 1 users. Thus, some resource pools may be indicated to be used always with single stage SCI whereas others are indicated to be associated with dual stage SCI by configuration. As such, there may be common resource pools for Mode 2 UEs, and dedicated resource pools may be configured for Mode 1 UEs.

Accordingly, the resources of the dedicated resource pools configured for Mode 1 UEs are not assigned to Mode 2 UEs, and so are not used for any autonomous scheduling operations. Therefore, the single stage SCI design configured for dedicated resource pools makes the communication spectrally more efficient and resilient compared to the case with dual stage SCI design with larger overhead and larger delays.

By associating single or dual stage SCI to the resource pool configuration, significant benefit in overhead reduction may be obtained. Nevertheless, UEs in a V2X environment may move large geographic distances and so it may be inefficient to configure statically the resource pools with single or dual stage SCI choice for all scenarios. Due to mobility, the Mode 1 UEs may move close to regions/zones where other users are performing sensing and hence, they may need to switch from single stage SCI to dual stage SCI to facilitate sensing of out-of-coverage sidelink UEs.

As a base station performs resource allocation for all Mode 1 UEs, it has information about location and the sensing need for neighbouring UEs due to network deployment. Therefore, in some examples, the base station may indicate usage of a specific SCI mode in dynamic signalling by sending dynamic signalling to sidelink UEs indicating the use of single or dual stage SCI. This dynamic signalling may be part of sidelink grant DCI. As an example, a single bit flag can be indicated in the sidelink grant DCI which indicates to the sidelink transmitter whether to use single or dual stage SCI for the granted transmission.

For the resource pools where SCI design can switch dynamically from single stage to dual stage, the sidelink receiver UEs monitor the two formats (ie single or dual stage SCI) to find the transmissions intended for them and to perform channel sensing. For any dedicated resource pools which are allocated to Mode 1 UEs using single stage SCI for transmissions, a sidelink receiver UE on these resource pools does not need to monitor for dual stage SCI design. Similarly, for any resource pools associated only to dual stage SCI, the sidelink receiver UEs on these resource pools do not need to monitor for single stage SCI.

In some examples, single or dual stage SCI may be configured to be dependent on a location of a transmitter UE. In particular, Zone ID (s) associated with resource pool usage may be used to determine whether the UE is to use a single or dual stage SCI. In particular, resource pools may be configured to be used in specific geographic areas (or "zones" in the V2X terminology). These zones may be identified with their Zone IDs or other appropriate identifier. When selecting a resource pool to use, a UE may determine the Zone ID it is in and use one of the resource pools that are configured to be used in that zone ID. A network may then, based on cell coverage information and/or statistics of past communications, configure Zone IDs of one or more resource pools to use either single or dual stage SCI. Accordingly, Zone IDs close to cell edges or where it is known to have Mode 2 users are configured to use dual stage SCIs. This configuration allows a dynamic switch between SCI design but based on a pre-configuration. This then avoids the need for dynamic signalling to change between single or dual stage SCI format. Whilst Zone ID is one way of representing the location of a device, the skilled person would recognise that other location indications may be used, such as latitude and longitude, or a region identifier.

When dual stage SCI is used for scheduling or reservation of sidelink resources, one of the main objectives of the first stage may be to facilitate the sensing operation at the neighbouring users. To meet this objective, the first stage SCI comprises the indication of time-frequency resource, it schedules or reserves. The first SCI stage may also include an indication about the intended receiver UE (s), as only the intended receiver UE (s) should be able to decode the second SCI stage and data. Thus, the first SCI stage is preferably decodable with minimal decoding effort, requiring as few blind decodes as possible. As first stage SCI is transmitted in a broadcast fashion, the objective is to be decodable at any UEs which may use this information.

To ensure the reliable decoding of the first SCI stage at all reachable UEs, the first SCI stage may be transmitted with robust coding protection so that even UEs receiving it under unfavourable channel conditions are able to decode and extract the relevant information. To this end, the first SCI stage may be transmitted with the strongest possible coding. As control information, here first stage SCI, is decoded without prior indication, it is typical to define a suitable number of protections or code rates. The transmitter UE uses one of the code rates among the possible ones, and the receiver UE tries to decode blindly among the possible set of the code rates to find the transmitted control information with a given code rate. These code rates used to encode the scheduling and control information are termed as "Aggregation Level". Thus, the strongest code (ie lowest code rate or highest aggregation level) may be used to encode the first stage SCI.

In some examples, the first stage SCI may be transmitted with the highest aggregation level. With the same reasoning that the first stage SCI is broadcast information and should be decodable at all reachable users, the modulation scheme used to transmit this information may be the most conservative one. For this reason, the first stage SCI may be transmitted with the lowest order modulation. For example, the first stage SCI modulation may be restricted to Quadrature Phase Shift Keying (QPSK).

The use of the highest aggregation level and lowest order modulation may facilitate the decoding of this first stage SCI even at UEs located at certain distance, but the time-frequency resource used to transmit this may be large. This is because the largest aggregation level and the lowest order modulation lowers the spectral efficiency, and thus very few useful bits get transmitted for a given time frequency resource. This may improve the reliable detection of scheduled/reserved resources at neighbouring UEs performing channel sensing.

Information regarding a network frequency plan and resource pool configuration is available to the network. Therefore, the network has access to information regarding which resource pools are used in wide areas and which resource pools are used in relatively limited areas. The resource pools which are used in wide areas may require UEs there to perform sensing in wider areas. This requires that such resource pools use more robust coding for the first stage SCI to facilitate the SCI-monitoring/decoding in this large area. Contrary to wide area resource pools, the resource pools used in limited areas may not require the sensing required information, carried in first stage SCI, to be widely decoded. Thus, the first stage SCI coding rates (or aggregation levels) for such resource pools need not necessarily be chosen to be the lowest coding rates (highest aggregation levels). This may be flexibly achieved by indicating the suitable coding rate or aggregation levels for the first stage SCI as part of resource pool configuration.

In some examples, the aggregation level (ie coding rate) of first stage SCI may be part of the resource pool configuration. If the aggregation levels for the first stage SCI is part of resource pool configuration, it is known to all UEs that may transmit and/or receive in this resource pool. Thus, this additional configurability does not add any additional decoding effort for the receivers in this resource pool.

Contrary to the first stage SCI, the second stage SCI is only destined to the target receiver UE (s). Thus, there is no need to transmit second stage SCI with the largest aggregation levels. Further, unicast and groupcast transmissions may enable channel information acquisition at the sidelink transmitter UE. Thus, initially the sidelink transmitter UE may be unaware of the receiver channel quality at the sidelink receiver UE, and may need to use a higher aggregation level (eg robust coding) for the second stage SCI. After acquiring the channel, the sidelink transmitter UE may send the second stage SCI (and optionally data carried in Physical Sidelink Shared Channel (PSSCH)) with suitable encoding levels. Thus, the sidelink transmitter UE can suitably choose the aggregation level of second stage SCI to match the channel quality of sidelink receiver UE.

It may be beneficial to reduce or completely eliminate the blind decoding efforts on different aggregation levels for the second stage SCI. For the aggregation level of second stage SCI, if the target receiver UE is close by, a very aggressive coding rate (ie low aggregation level), may be sufficient to enable decoding at the target receiver UE with efficient transmission. Otherwise a suitable aggregation level may be used for the second stage SCI which allows its decodability at the target receiver UE with the desired probability of detection. In case of detection failure for the second stage SCI, and if re-transmission occurs for the second stage SCI (optionally with data), the sidelink transmitter UE may increase the aggregation level. Accordingly, the aggregation level for the second stage of SCI may be updated in a dynamic manner. Preferably, indication the aggregation level for the second stage SCI may be transmitted as part of the first stage SCI.

In some examples, the aggregation level of the second stage SCI may be dynamically indicated. This indication may be comprised in the information carried in the first stage SCI. Alternatively, the aggregation level for the second stage SCI may be kept implicit and it may be determined implicitly as a function of location of first stage SCI or second stage SCI or a combination of both.

The payload size for the first stage SCI will normally be fixed and mostly relevant to indicate the time-frequency resource, plus the identity of the intended receiver UE (s). The situation is different for the second stage SCI. There are use cases which may require a certain number of information bits in the second stage SCI which can be very different in size from one case to the other. One example is Hybrid automatic repeat request (HARQ) enabled or HARQ-less transmissions, which require different number of information bits in the control. Another example is the physical layer transmission mode, whether single-input single-output (SISO) or multiple-input multiple-output (MIMO) is used which also changes the number of bits to be indicated in the sidelink control information. As first stage SCI is targeted to be of the same size, all of these changes are handled in the second stage SCI. If the second stage SCI may have different sizes and no prior indication of its size, it may increase the blind decode effort at the intended receiver UE (s). Such increase of decoding effort may be avoided by indicating the size of the second stage SCI in the first stage SCI.

In some examples, the size of the second stage SCI may be indicated in the first stage SCI. This indication may comprise the size of the information bits in the second stage SCI. Accordingly, based on the aggregation level and the size of the second stage SCI, the intended receiver UE may determine the size of the second stage SCI. It can use the pre-defined rules to locate the portion of indicated time frequency resource which carries this second stage SCI. Alternatively, the time-frequency resource for the second stage SCI may be indicated. This combined with the aggregation level used for the second stage SCI allows the intended receiver UE (s) to locate and decode the second stage SCI.

In some examples, if a plurality of SCI formats are possible for second stage SCI (for example to accommodate the cases such as single scheduling, multiple scheduling, single or multiple resource reservation etc) the sizes for the dual stage SCI may be predetermined by configuration and the first stage SCI indicates which format the sidelink receiver UE should expect in the second stage SCI. Accordingly, the sidelink receiver UE is configured with information regarding which SCI size it is expected to receive in the second stage SCI based on the indicated format for the second stage SCI.

To reduce the overhead of location indication for the second stage SCI, mapping the second stage SCI may start from a fixed physical resource block (PRB) (ie sub-channel) location in the scheduled resource for PSSCH. The coded bits of the second stage SCI may be mapped on the portion of time-frequency resource assigned for PSSCH starting from this fixed start location, following pre-defined mapping rules. One example mapping strategy may be to start from the lowest PRB and first useful PSSCH symbol and consume the resource for the first symbol and then go to the next symbol if there are still bits to be mapped. A truncation or padding may be adopted such that the resource consumed for the second stage SCI is on the granularity of the PRB. The first useful symbol may be the one following the Automatic Gain Control (AGC) symbol if any. Advantageously, this enables quick SCI detection and hence a quicker overall detection for PSSCH compared to a scheme which first uses time resources for SCI transmission.

In some examples, the second stage SCI may be mapped from the lowest PRB of the first useful symbol scheduled for PSSCH.

As second stage SCI may use the same demodulation reference symbols (DMRS) as of data in PSSCH, the front-loaded DMRS may be helpful for fast SCI detection and the second stage SCI may follow right after the front-loaded DMRS symbol. To improve the spectral efficiency, the mapping of SCI may be started from the front-loaded DMRS, over the unused resource elements. The DMRS pattern and the number of layers (if used) may be sent to the receiver UE in the first stage SCI for the receiver UE to decode the second stage SCI.

As discussed earlier, a fixed mapping for second stage SCI in the scheduled resource may save any overhead for indicating the second stage SCI resource if the second stage SCI can be mapped flexibly in the scheduled resource. However, in certain situations, if the scheduled resource is of a specific size, shape, more flexibility in configuring second stage SCI may be desired. A more flexible mapping may be to configure a plurality of options in a mapping table as to where second stage SCI will be located in the PSSCH resource and the selected entry from this mapping table may be indicated by providing its row index in the first stage SCI.

The second SCI stage may use the same lower order modulation as the first stage SCI, like QPSK. This may help keep the high reliability for the second stage SCI detection. In case, more flexibility and higher spectral efficiency is required, a variety of modulations may be used in the second SCI stage. This would require some blind decodes if done without an indication. Accordingly, an indication may be transmitted in the first stage SCI providing the modulation scheme of the second stage SCI to avoid the blind decode overhead. This framework may be enhanced by making a mapping table which has certain entries for modulation and coding scheme (modulation and aggregation level) for the second stage SCI and the first stage SCI carries the suitable row index from this mapping table.

In some examples, the first stage SCI may carry an indication of the modulation and aggregation level for the second stage SCI. This indication may be in the form of a row index from a pre-defined mapping table in which each row defines a suitable combination of modulation and aggregation level.

The second stage SCI may be embedded in the resource used to transmit data (PSSCH), and it will use the same DMRS as of data for demodulation. The data (PSSCH) may be transmitted using a variety of advanced schemes, such as pre-coding or multi-layer transmissions. The multi-layer transmissions may be useful to improve the spectral efficiency for data but they may not be suitable for second stage SCI and may compromise its reliability. Accordingly, the second stage SCI may be transmitted using the same antenna port as used for PSSCH when it is single layer transmission. In the case when PSSCH is transmitted using more than one spatial layers, second stage SCI may be transmitted using only the first layer (first antenna port) used to transmit PSSCH and the additional layers for the resource elements carrying PSCCH do not carry anything to avoid the interference for SCI decoding.

In some examples, the second stage SCI, PSCCH, may be a single layer transmission using the same antenna port as of the first layer of PSSCH. This layer may be aligned to the first layer of PSSCH, if PSSCH is multi-layer transmission.

To avoid unwanted blind decoding and too many detection combinations, single stage SCI and the first stage of a dual stage SCI may preferably have the same number of bits, as some receiver UEs may not know in advance which of the two designs (ie single or dual stage SCI) it will receive.

However, the information carried in the two cases is not the same. In the single stage SCI, all the information needed is carried in the unique SCI. On the other hand, in the first stage of a dual stage SCI, only partial information is conveyed. This is primarily the sensing related information and some information related to the second stage SCI, as described above (eg size or format, AL, MCS, position or multiplexing indication). The single stage and dual stage may co-exist for different reasons. For example, the design and usage of single and dual stage may be dependent upon resource allocation mode and also based upon cast type of the current transmission. To reduce the blind decoding, no matter what the background reasons, it may be useful to keep the first stage of dual stage SCI of the same size as of the single stage SCI, for example, when they co-exist for different cast types.

In some examples, when single and dual stage SCI are coexisting, the first stage of the dual stage SCI may contain the same number of bits as of the single stage SCI design. Information and signalling to avoid blind decoding of the second stage SCI may be put in the first stage SCI with the same number of bits than the information of the single stage SCI that are transferred in the second stage SCI.

Information only needed by the destination of the data payload may be passed to the second stage SCI, such as MCS, HARQ ID, RV, NDI, CSI indication or request etc. The bits used by these information fields in the single stage SCI design may then be reused (ie re-farmed) in the first stage of dual stage SCI design for indicating how to decode the second stage SCI, such as multiplexing indications, AL, MCS, and size or format of the second stage.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

What is claimed is:

1. A method for transmission of scheduling and control information for sidelink communications, the method comprising steps performed at a mobile device of:
    receiving and decoding a first stage Sidelink Control Information (SCI) carrying scheduling information,
    receiving a second stage SCI indicated by the first stage SCI, and
    decoding the second stage SCI at an intended receiver,
    wherein the second stage SCI uses lower order modulation including Quadrature Phase Shift Keying (QPSK),
    wherein the coded bits of the second stage SCI are mapped from a lowest physical resource block (PRB) locations in the scheduled resource for Physical Sidelink Shared Channel (PSSCH), and
    wherein a modulation and coding scheme for the second stage SCI is indicated in the first stage SCI as a row index for a mapping table comprising modulation and coding schemes values for the second stage SCI.

2. A method according to claim 1, a modulation and coding scheme for the first stage SCI is indicated as part of the resource pool configuration.

3. A method according to claim 1, wherein
the first stage SCI indicates the SCI of the associated second stage SCI.

4. A method according to claim 1, wherein
the mapping of the second stage SCI in PSSCH starts from a front-loaded demodulation reference symbol DMRS symbol over unused resource elements.

5. A method according to claim 1, wherein
the first stage SCI indicates a modulation and coding scheme of the associated second stage SCI.

6. A method according to claim 1, further comprising
a step of identifying from the scheduling information in the first stage SCI if the mobile device is the intended receiver of the second stage SCI.

* * * * *